(12) United States Patent
Singh et al.

(10) Patent No.: US 8,400,955 B2
(45) Date of Patent: Mar. 19, 2013

(54) SYSTEM AND METHOD FOR POWER SAVING BY COORDINATED WAKE-UP IN A WIRELESS MULTI-BAND NETWORK

(75) Inventors: Harkirat Singh, Santa Clara, CA (US); Julan Hsu, Saratoga, CA (US); Chiu Ngo, San Francisco, CA (US)

(73) Assignee: Samsung Electronics Co., Ltd., Suwon (KR)

( * ) Notice: Subject to any disclaimer, the term of this patent is extended or adjusted under 35 U.S.C. 154(b) by 427 days.

(21) Appl. No.: 12/721,340

(22) Filed: Mar. 10, 2010

(65) Prior Publication Data

US 2011/0069650 A1 Mar. 24, 2011

Related U.S. Application Data

(60) Provisional application No. 61/244,343, filed on Sep. 21, 2009.

(51) Int. Cl.
*G08C 17/00* (2006.01)
(52) U.S. Cl. ........... 370/311; 340/1.1; 340/6.1; 340/7.2; 340/7.32; 455/73; 455/550.1; 455/572; 455/574
(58) Field of Classification Search .................. 370/311; 340/7.32–7.38; 455/343.1–343.4
See application file for complete search history.

(56) References Cited

U.S. PATENT DOCUMENTS

| | | | |
|---|---|---|---|
| 6,640,087 B2 | 10/2003 | Reed et al. | |
| 7,366,089 B2 | 4/2008 | Tehrani et al. | |
| 7,831,738 B2 | 11/2010 | Rofougaran | |
| 8,077,683 B2 | 12/2011 | Rudolf et al. | |
| 2005/0143133 A1 | 6/2005 | Bridgelall | |
| 2005/0288022 A1* | 12/2005 | Ryu et al. | 455/439 |
| 2006/0268760 A1 | 11/2006 | Fang et al. | |
| 2007/0002876 A1 | 1/2007 | Berkman et al. | |

(Continued)

FOREIGN PATENT DOCUMENTS

| | | |
|---|---|---|
| GB | 2415573 A | 6/2004 |
| KR | 1020090089373 A | 8/2009 |

(Continued)

OTHER PUBLICATIONS

Cianca et al., Location/Situation-Aware Architecture for Mobility Management over Heterogeneous Networks, Proceedings of the 2nd International Conference on Mobile Multimedia Communications, 2006, 6 pages.

(Continued)

*Primary Examiner* — Charles C Jiang
(74) *Attorney, Agent, or Firm* — Kenneth L. Sherman, Esq.; Michael Zarrabian, Esq.; Sherman & Zarrabian LLP

(57) ABSTRACT

A system and method for wireless communication over multi-rate channels are disclosed. One embodiment of the system operates on wake-up schedules for power saving. The system includes a first multi-band wireless station that is capable of using a first frequency band and a second frequency band for wireless communication; and a second multi-band wireless station that is capable of using the first frequency band and the second frequency band for wireless communication. One or more of the first and second stations is configured to maintain therein one or more wake-up schedules on the second frequency band of one or more of the first station, the second station, and an access point. The first and second stations are configured to share the one or more wake-up schedules with each other via the first frequency band. The system allows the stations to effectively associate with each other, thereby saving power.

39 Claims, 10 Drawing Sheets

U.S. PATENT DOCUMENTS

| | | | |
|---|---|---|---|
| 2007/0099668 | A1 | 5/2007 | Sadri et al. |
| 2007/0195721 | A1 | 8/2007 | Backes et al. |
| 2007/0258508 | A1 | 11/2007 | Werb et al. |
| 2008/0096560 | A1 | 4/2008 | Felske et al. |
| 2009/0232049 | A1* | 9/2009 | Singh et al. ............ 370/328 |
| 2010/0014458 | A1 | 1/2010 | Singh et al. |
| 2010/0034143 | A1 | 2/2010 | Cordeiro et al. |
| 2010/0074190 | A1 | 3/2010 | Cordeiro et al. |
| 2010/0265990 | A1 | 10/2010 | Birru |
| 2010/0315954 | A1 | 12/2010 | Singh et al. |
| 2011/0038290 | A1* | 2/2011 | Gong et al. ............ 370/311 |
| 2011/0128901 | A1* | 6/2011 | Lee et al. ............ 370/311 |
| 2011/0205928 | A1* | 8/2011 | Pelletier et al. ............ 370/252 |

FOREIGN PATENT DOCUMENTS

| | | |
|---|---|---|
| WO | 2010036595 A2 | 1/2010 |

OTHER PUBLICATIONS

Courville et al, "Evaluation of centralized adhoc network architecture (CANA)," BAI cluster workshop Mar. 2004, IST BroadWay project, Jun. 1, 2004, 17 pages.

Draves et al., "Routing in multi-radio, multi-hop wireless mesh networks," 15 pages, MobiCom '04, Sep. 26-Oct. 1, 2004.

Heinzelman et al., "Energy efficient communication protocol for wireless microsensor networks," Proc. The 33rd Hawaii International Conference on System Science, Hawaii, U.S.A., Jan. 2000, pp. 1-10.

Iannone et al., "Can multi-rate radios reduce end-to-end delay in mesh networks? A simulation case study," Mesh Networking: Realizing the Wireless Internet (Meshnets), Jul. 2005, pp. 1-10.

IEEE 802.11 Standard for Information technology—Telecommunications and information exchange between systems—Local and metropolitan area networks—Specific requirements. Part 11: Wireless LAN Medium Access Control (MAC) and Physical Layer (PHY) specifications, IEEE Computer Society, pp. 87-140, 146-148, 456-461, (Jun. 12, 2007).

IEEE 802.11, Standard for Information Technology—Telecommunications and Information Exchange between Systems—Local and Metropolitan Area Networks—Specific requirements Part 11: Wireless LAN Medium Access Control (MAC) and Physical Layer (PHY) Specifications-2007 (Revision of IEEE Std 802.11-1999), IEEE Computer Society, 1232 pages, (Jun. 12, 2007).

IEEE P802.11nTM/ D3.00, Draft Standard for information technology—Telecommunications and information exchange between systems—Local and metropolitan area networks—Specific requirements—Part 11: Wireless LAN Medium Access Control (MAC) and Physical Layer (PHY) specifications: Amendment 4: Enhancements for Higher Throughput, IEEE, Sep. 2007, pp. 1-544.

IEEE P802.11nTM/ D3.00, Draft Standard for information technology—Telecommunications and information exchange between systems—Local and metropolitan area networks—Specific requirements—Part 11: Wireless LAN Medium Access Control (MAC) and Physical Layer (PHY) specifications: Amendment 8: Medium Access Control (MAC) Quality of Service Enhancements IEEE, 2005, pp. 1-211.

IEEE P802.11zTM/ D1.0, Draft Standard for information technology—Telecommunications and information exchange between systems—Local and metropolitan area networks—Specific requirements—Part 11: Wireless LAN Medium Access Control (MAC) and Physical Layer (PHY) specifications: Amendment 7: Direct Link Setup, IEEE, Mar. 2008, pp. 1-36.

IST Broadway, "A 5/60GHz hybrid system concept", 12 pages; available at www.ist-browadway.org/documents/broadway-broadband_air_interfaces_cluster.pdf (last visited on Apr. 24, 2008).

Madhow, "MultiGigabit millimeter wave communication: System concepts and challenges," Department of Electrical and Computer Engineering, UCSB, Workshop Jan./Feb. 2008, pp. 193-196.

Poroor et al., Fast Dual-Radio Cross-Layer Handoffs in Multi-Hop Infrastructure-mode 802.11 Wireless Networks for In-Vehicle Multimedia Infotainment, IEEE ANTS 2008, 3 pages.

Ramachandran et al., "Interference-aware channel assignment in multi-radio wireless mesh networks," Infocom 2006.

Ros et al., "Cluster-based OLSR extensions to reduce control overhead in mobile Ad hoc networks," International wireless Communications and Mobile Computing Conference (IWCMC 2007) Department of Information and Communications Engineering, University of Murcia, pp. 202-207, Aug. 12-16, 2007, Honolulu, Hawaii, U.S.A.

Vaios et al., Increasing Capacity in Dual-Band WLANS Through AD-HOC Networking, University of Athens, Department of Informatics & Telecommunications, International Journal of Wireless and Mobile Computing (IJWMC), Special Issue on Wireless Ad Hoc Networking, 2005, 13 pages.

Villasenor-Gonzalez et al., "HOLSR: A hierarchical proactive routing mechanism for mobile Ad hoc networks," IEEE Communications Magazine (Jul. 2005).

Notification of Transmittal of the International Search Authority, International Search Report and Written Opinion dated May 19, 2011 for International Application No. PCT/KR2010/006497 from Korean Intellectual Property Office, pp. 1-9, Seo-gu, Daejeon, Republic of Korea.

U.S. Non-Final Office Action for U.S. Appl. No. 12/482,328 mailed Jan. 25, 2012.

U.S. Notice of Allowance for U.S. Appl. No. 12/482,328 mailed May 2, 2012.

U.S. Non-Final Office Action for U.S. Appl. No. 12/721,364 mailed Jun. 12, 2012.

European Search Report dated Jul. 3, 2012 for European Application No. 10817474.9 from European Patent Office, pp. 1-7, The Hague, Rijswijk, The Netherlands.

U.S. Final Office Action for U.S. Appl. No. 12/721,364 mailed Nov. 21, 2012.

* cited by examiner

SYSTEM AND METHOD FOR POWER SAVING BY COORDINATED WAKE-UP IN A WIRELESS MULTI-BAND NETWORK

RELATED APPLICATION

This application claims priority from U.S. Provisional Patent Application No. 61/244,343, filed on Sep. 21, 2009, which is incorporated herein by reference. This application is related to U.S. patent application Ser. No. 12/721,364, entitled "SYSTEM AND METHOD FOR WIRELESS MULTI-BAND NETWORKS ASSOCIATION AND MAINTENANCE" (Inventors: Singh et al.; filed on even date herewith), the disclosure of which is incorporated by reference in its entirety.

BACKGROUND OF THE INVENTION

1. Field of the Invention

The present invention relates to a wireless network, and in particular, to a wireless network having multi-rate channels.

2. Description of the Related Technology

Wireless networks typically include a plurality of wireless stations. Such wireless stations can communicate with each other on a wireless channel having a selected frequency.

Certain wireless stations can use multiple channels for transmission and/or reception of signals. For example, a wireless station can use a high-rate channel (for example, 60 GHz channel) and a low-rate channel (2.4/5 GHz channel). Such a wireless station can use either or both of the channels, depending on the needs.

It is often desirable to use a higher frequency channel among the multiple channels to have a higher transmission rate. However, such a higher frequency channel may not be always available for transmission between two wireless stations at a given time. Thus, there is a need for managing the use of the multiple channels to optimize wireless transmissions between the wireless stations.

SUMMARY OF CERTAIN INVENTIVE ASPECTS

In one embodiment, there is a device for wireless communication. The device comprises: a first antenna system configured to use a first frequency band for wireless communication; and a second antenna system configured to use a second frequency band for wireless communication. The second frequency band is different from the first frequency band. The device further comprises a memory configured to store information comprising one or more wake-up schedules on the second frequency band of the device and/or other wireless devices; and a medium access control (MAC) layer configured to transmit and/or receive a signal via a pre-established wireless link on the first frequency band, wherein the signal contains at least part of the one or more wake-up schedules.

In another embodiment, there is a wireless communication system. The system comprises: a first multi-band wireless station that is capable of using a first frequency band and a second frequency band for wireless communication. The second frequency band is different from the first frequency band. The system also comprises a second multi-band wireless station that is capable of using the first frequency band and the second frequency band for wireless communication. One or more of the first and second stations is configured to maintain therein one or more wake-up schedules on the second frequency band of one or more of the first station, the second station, and an access point. The first and second stations are configured to share the one or more wake-up schedules with each other via the first frequency band.

In yet another embodiment, there is a method of wireless communication. The method comprises: establishing, by a first multi-band wireless station capable of using first and second frequency bands for wireless communication, a wireless link on the first frequency band with a second multi-band wireless station capable of using the first and second frequency bands for wireless communication. The second frequency band is different from the first frequency band. The method also comprises transmitting, by the first station, one or more wake-up schedules on the second frequency band to the second station via the first frequency band. The one or more wake-up schedules comprise a wake-up schedule of the first station and/or an access point. The access point is associated with the first station on the second frequency band.

In yet another embodiment, there is a method of wireless communication. The method comprises: establishing, by a first multi-band wireless station capable of using first and second frequency bands for wireless communication, a wireless link on the first frequency band with a second multi-band wireless station capable of using the first and second frequency bands for wireless communication. The second frequency band is different from the first frequency band. The method also comprises receiving, by the first station, one or more wake-up schedules on the second frequency band from the second station via the first frequency band. The one or more wake-up schedules comprise a wake-up schedule of the second station and/or an access point. The access point is associated with the second station on the second frequency band.

DETAILED DESCRIPTION OF CERTAIN INVENTIVE EMBODIMENTS

Figure 1:
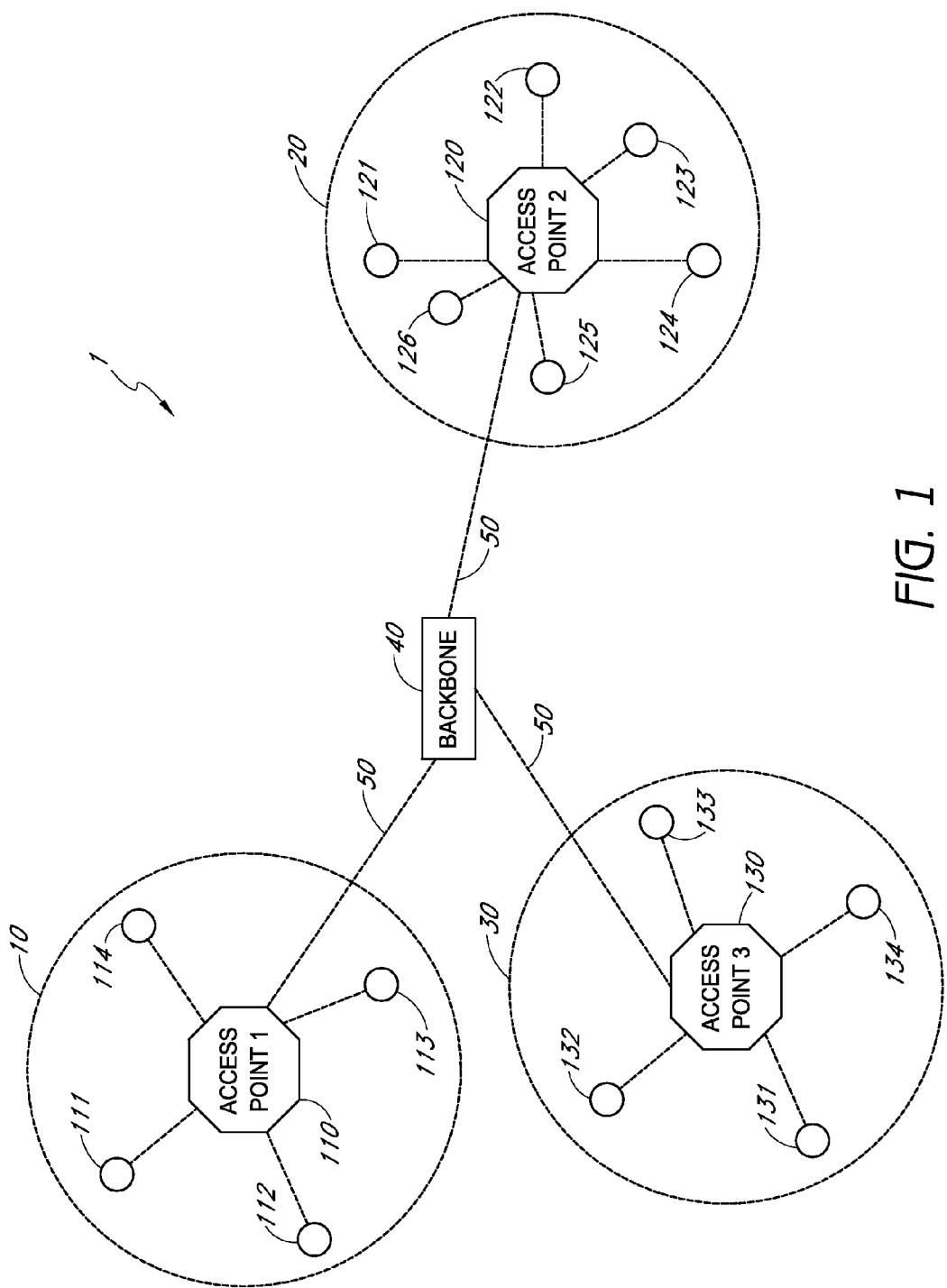
FIG. 1 is a block diagram illustrating an example wireless network including a plurality of sub-networks.

The following detailed description of certain embodiments presents various descriptions of specific embodiments of the invention. However, the invention can be embodied in a multitude of different ways as defined and covered by the claims. In this description, reference is made to the drawings where like reference numerals indicate identical or functionally similar elements.

The terminology used in the description presented herein is not intended to be interpreted in any limited or restrictive manner, simply because it is being utilized in conjunction with a detailed description of certain specific embodiments of the invention. Furthermore, embodiments of the invention may include several novel features, no single one of which is solely responsible for its desirable attributes or which is essential to practicing the inventions herein described. Various processors, memories, computer readable media and programs can be used to implement the invention.

Overview of Wireless Network

Referring to FIG. 1, an example wireless network will be described below. The wireless network 1 includes a plurality of sub-networks 10, 20, 30 and a network backbone 40. The illustrated portion of the network 1 includes three sub-networks, but a skilled technologist will appreciate that the network can include more or less sub-networks.

Each of the sub-networks 10, 20, 30 includes an access point 110, 120, 130 and one or more wireless stations or devices 111-114, 121-126, 131-134. Each of the access points 110-130 is capable of performing wireless communication with the one or more wireless stations within the sub-network according to a wireless communication protocol. The access points 110-130 are also connected to the network backbone 40 via wired or wireless channels 50. Each of the access points 110-130 may provide communication between stations within its respective sub-network 10-30 or between a station in its sub-network and another station in another sub-network. The term "access point" can also be referred to as a "coordinator" in this document. A network including such an access point can be referred to as an infrastructure network. In the context of this document, an access point and non-access point stations in communication with the access point can be collectively referred to as a basic service set.

The one or more wireless stations 111-114, 121-126, 131-134 are located within a coverage region within which the access point can communicate wirelessly. The one or more stations 111-114, 121-126, 131-134 can be electronic devices that can wirelessly connect to one or more of the access points 110, 120, 130. Examples of such electronic devices include, but are not limited to, a mobile phone, a smart phone, a telephone, a television, a set-top box, a computer monitor, a computer, a hand-held computer, an electronic book device, a personal digital assistant (PDA), a microwave, a refrigerator, a stereo system, a cassette recorder or player, a DVD player or recorder, a CD player or recorder, a VCR, a digital video recorder (DVR), an MP3 player, a radio, a camcorder, a camera, a digital camera, a portable memory chip, a washer, a dryer, a washer/dryer, a copier, a facsimile machine, a scanner, a multi functional peripheral device, a wrist watch, a clock, a game device, etc. In certain arrangements, one or more stations can belong to two or more sub-networks. In certain embodiments, at least one of the access points 110, 120, 130 may be part of such an electronic device.

The network backbone 40 serves to interconnect the sub-networks 10, 20, 30 to one another, providing a path for the exchange of information between them. The network backbone 40 can be connected to another backbone for communication with another network.

In one embodiment, the sub-networks 110-130 may be in compliance with the same communication protocol. In other embodiments, one of the sub-networks 110-130 may comply with a communication protocol different from the protocols of the other sub-networks. In some embodiments, the sub-networks 110-130 can use different frequency bands from one another. In certain arrangements, the access points and the stations may be in compliance with the IEEE 802.11 standard. In one embodiment, the network 1 can form a wide area network (WAN), and each of the sub-networks 10-30 can form a local area network (LAN). In another embodiment, the network 1 can form a local area network (LAN). In certain embodiments, at least one of the sub-networks 110-130 may form an ad-hoc network without an access point.

Wireless Networks Employing Multi-Rate Channels

In some embodiments, a wireless station or device can use multiple channels for transmission and/or reception of data or control signals. Such a wireless station or device can be referred to as a multi-band station or device in the context of this document. In this document, the term "channel" can be interchangeably used with "band," "frequency band," or "frequency." For example, the multiple channels can include two or more channels, including, but not limited to, 2.4/5 GHz (for example, in current WiFi), 60 GHz, Bluetooth band (2.4 GHz), and Terahertz.

In one embodiment, a wireless station can use two channels: a high-rate channel (HRC) and a low-rate channel (LRC) for transmission and/or reception. The term "high-rate channel" can be interchangeably used with "high frequency channel," "high frequency band," "high-rate band," or "high band" in this document. The term "low-rate channel" can be interchangeably used with "low frequency channel," "low frequency band," "low-rate band," or "low band" in this document.

The high-rate channel has a shorter range than the low-rate channel. The high-rate channel may be directional whereas the low-rate channel may be directional or omni-directional. In certain embodiments, the low rate channel may be omni-directional as a default, and optionally directional. The channels can be established to be directional or omni-directional by using different antenna systems. In the context of this document, the terms "directional channel" and "omni-directional channel" can be interchangeably used with "directional transmission/reception capability" and "omni-directional transmission/reception capability," respectively.

In one embodiment, the high-rate channel may have a frequency from about 6 GHz to about 300 GHz. Such a frequency may include an extremely high frequency (EHF). The high-rate channel may be a 60 GHz channel that is supported by 60 GHz millimeter-wave radio. In one embodiment, the communication range of a 60 GHz channel for an indoor environment may be of the order of 10 meters. In other embodiments, the high-rate channel can use a terahertz frequency ranging between 300 GHz and 3 THz.

The low-rate channel may be a channel having a frequency below 6 GHz. In one embodiment, the low-rate channel can be a 2.4 GHz or 5 GHz channel that can support Wireless Local Area Network (WLAN). The interface for the low-rate channel may be in compliance with IEEE 802.11. In one embodiment, the low-rate channel for an indoor environment that has a frequency lower than 6 GHz can have a range of about 20 meters to about 100 meters.

Figure 2:
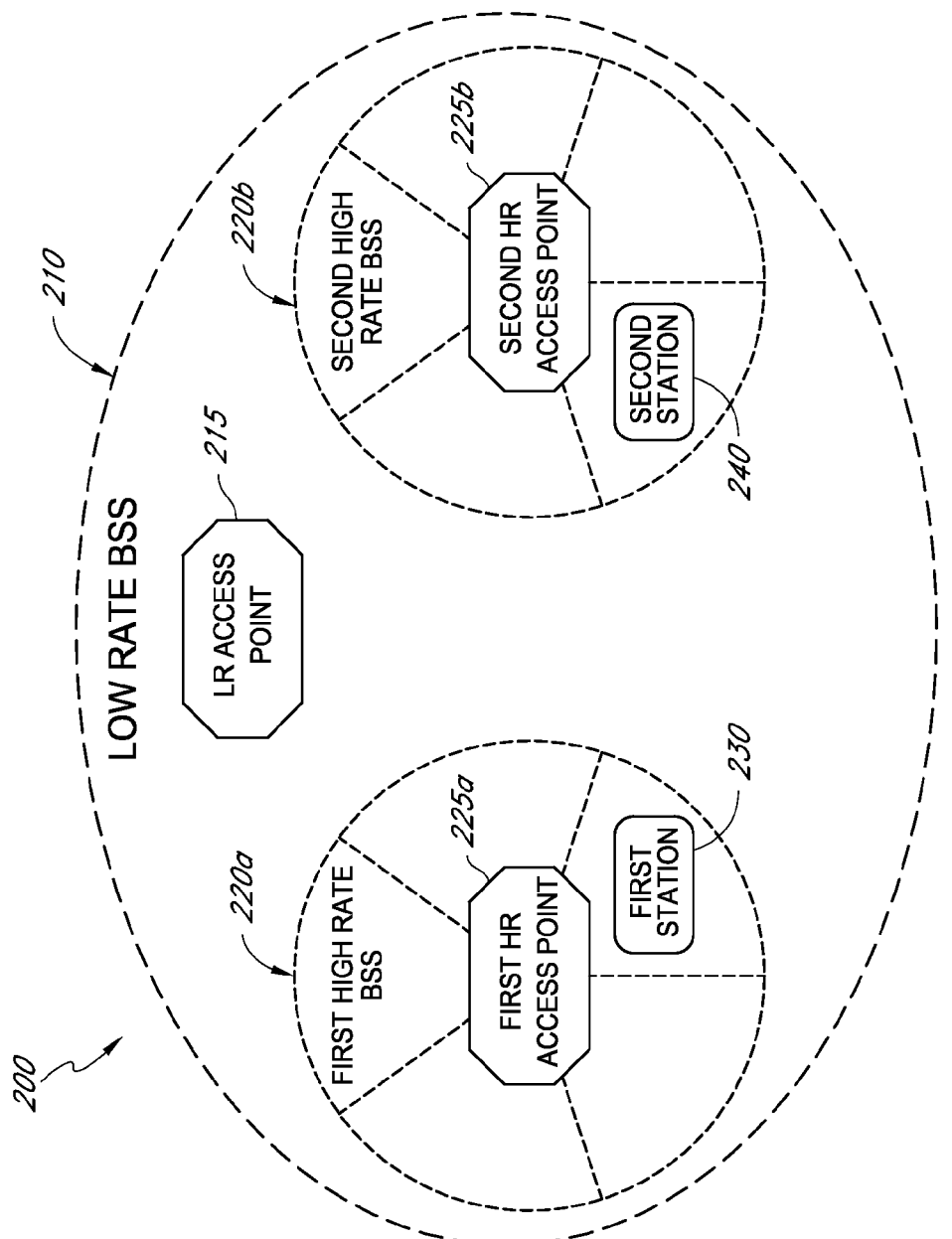
FIG. 2 is a block diagram of a wireless network including a low-rate basic service set and high-rate basic service sets according to one embodiment.

In some embodiments, a multi-band station can be part of multiple infrastructure networks that use channels of different frequencies. Referring to FIG. 2, one embodiment of such multiple infrastructure networks will be described below. The illustrated wireless system 200 includes a low-rate (LR) infrastructure network 210, a first high-rate (HR) infrastructure network 220a, and a second high-rate (HR) infrastructure network 220b.

The LR network 210 overlaps with the first HR network 220a and the second HR network 220b. Because the LR network 210 uses a lower rate channel than the HR networks 220a, 220b in data or control signal transmissions, the LR network 210 has a greater coverage than the HR networks 220a, 220b. The first and second HR networks 220a, 220b do not overlap with each other due to a distance between them. The LR network 210 can include a low-rate (LR) access point 215. The first and second HR networks 220a, 220b can include first and second high-rate (HR) access points, respectively. The first HR access point 225a may also be referred to as a first personal basic service set (PBSS) control point (PCP) in the context of this document. The second HR access point 225b may also be referred to as a second personal basic service set (PBSS) control point (PCP) in the context of this document.

The system 200 can also include a first multi-band station 230 and a second multi-band station 240. In the illustrated instance, the first multi-band station 230 is associated with the low-rate access point 215, and thus is part of the LR network 210 when using a low-rate channel. The first multi-band station 230 is also associated with the first high-rate access point 225a, and thus is part of the first HR network 220a when using a high-rate channel. The second multi-band station 240 is also associated with the low-rate access point 215, and thus is part of the LR network 210 when using the low-rate channel. The second multi-band station 240 is also associated with the second high-rate access point 225b, and thus is part of the second HR network 220b when using the high-rate channel.

In the embodiment shown in FIG. 2, the LR network 210 that includes devices using the low-rate channel (for example, the LR access point 215, the first station 230, and the second station 240) can be referred to as a low-rate basic service set (LRBSS). The first HR network 220a that includes devices using the high-rate channel (for example, the first HR access point 225a and the first station 230) can be referred to as a first high-rate basic service set (HRBSS1). The second HR network 220b that includes devices using the same high-rate channel as the first high-rate network 220a (for example, the second HR access point 225b and the second station 240) can be referred to as a second high-rate basic service set (HRBSS2).

During operation, the LR access point 215 can communicate with either or both of the first and second stations 230, 240 via the low-rate channel. In one embodiment, the first and second stations 230, 240 can start communication with the LR access point 215 by performing an association process. In certain embodiments, the low-rate access point 215 can transmit low-rate beacon signals periodically to inform a transmission schedule that can be used by devices within the network 210.

In the context of this document, the term "association" can refer to a process to establish a link between an access point and a non-access point station or between non-access point stations. In one embodiment, the association process allows a non-access point station to join in a network. The association process can include exchange of an association request and an association response between an access point and a non-access point station. The association process can also include authentication of devices involved in the process. In certain embodiments, an association process for the high-rate channel can include beamforming for directional transmission. In other embodiments, the association process can refer to a process for establishing a link between two non-access point stations, which can involve exchange of control frames, beamforming, and/or authentication.

The first and second stations 230, 240 can communicate with each other on the low-rate channel via the LR access point 215. In another embodiment, the first and second stations 230, 240 can communicate directly with each other on the low-rate channel via a direct link or a peer-to-peer link, without using the LR access point 215.

In some embodiments, the first HR access point 225a can transmit first beacon signals periodically to inform a transmission schedule that can be used by devices within its network 220a. The first beacon signals are transmitted over the high-rate channel, and can be directional. The first beacon signals can also be used by devices to determine whether the devices are within the coverage of the first HR network 220a. If it is determined that the devices are within the coverage of the first HR network 220a, such devices can start communication with the first HR access point 225a by performing an association process. Devices that have been associated with the first HR access point 225a can communicate with each other on the high-rate channel, either via the first HR access point 225a or directly.

Similarly, the second HR access point 225b can transmit second beacon signals periodically to inform a transmission schedule that can be used by devices within its network 220b. The second beacon signals are transmitted over the high-rate channel, and can be directional. The second beacon signals can include different information from the first beacon signals, and can be used by devices to determine whether the devices are within the coverage of the second HR network 220b. If it is determined that the devices are within the coverage of the second HR network 220b, such devices can start communication with the second HR access point 225b by performing an association process. Devices that have been associated with the second HR access point 225b can communicate with each other on the high-rate channel, either via the second HR access point 225b or directly.

In the illustrated example, the first station 230 is within the coverage of the first HR basic service set 220a, and is associated with the first HR access point 225a. The second station 240 is within the coverage of the second HR basic service set 220b, and is associated with the second HR access point 225b. In certain embodiments, the multi-band stations 230, 240 may operate in a distributed mode without being associated with the first or second HR access points 225a, 225b.

In the illustrated example, the first and second stations 230, 240 can communicate with each other over the low-rate channel, but not over the high-rate channel due to a distance between them. However, when either or both of the first and second stations 230, 240 are relocated close enough to each other to allow communication over the high-rate channel, they can also communicate over the high-rate channel.

Figure 3:
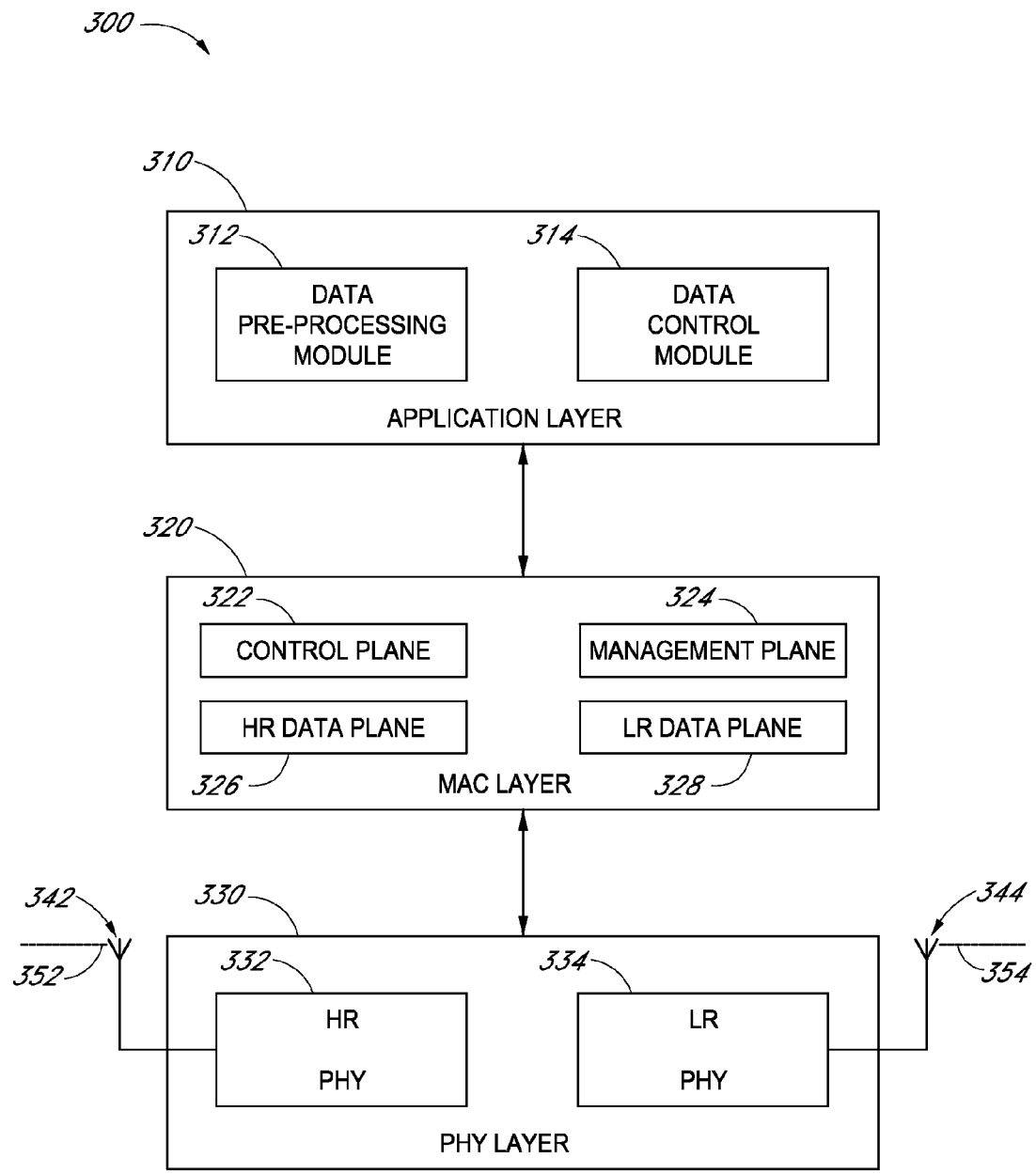
FIG. 3 is a block diagram illustrating a multi-band wireless device having high-rate and low-rate communication capabilities according to one embodiment.

Referring to FIG. 3, a multi-band wireless station that can communicate with one or more stations or access points via a high-rate channel and a low-rate channel according to one embodiment will be described below. The illustrated wireless station 300 may serve as a transmitter. The wireless station 300 can include an application layer 310, a medium access control (MAC) layer 320, and a physical (PHY) layer 330, and a first antenna system 342, and a second antenna system 344.

The application layer 310 may include a data pre-processing module 312 and a data control module 314. The data pre-processing module 312 can perform pre-processing of data, such as partitioning of data. The data control module 314 provides a standard way to exchange data handling information such as capability information. For example, before a connection begins, the data control module 314 negotiates the data formats to be used, and when the need for the connection is completed, data control commands are used to stop the connection.

The MAC layer 320 may include a control plane 322, a management plane 324, a high-rate data plane 326, and a low-rate data plane 328. The control plane 322 serves to control how the station 300 gains access to data and permission to transmit it over the network. In one embodiment, at least one of the control plane 322 can include a high-rate control plane and a low-rate control plane to provide access control over the high-rate channel and the low-rate channel, respectively. Further, the management plane 324 can include a high-rate management plane and a low-rate management plane to provide channel management over the high-rate channel and the low-rate channel, respectively.

The high-rate data plane 326 serves to process data from the application layer 310 to form packets suitable for high-rate transmission over a high-rate channel 352. The low-rate data plane 328 serves to process data from the application layer 310 to form packets suitable for low-rate transmission over a low-rate channel 354. In one embodiment, both the high rate data plane 326 and the low rate data plane 328 may use the control plane 322 and the management plane 324 when transmitting data. In other embodiments, each of the high rate data plane 326 and the low rate data plane 328 can include dedicated control and management planes.

The PHY layer 330 serves to further process the data and/or control packets from the MAC layer 320, and send them over wireless channels. The illustrated PHY layer 330 includes a high-rate (HR) PHY module 332 and a low-rate (LR) PHY module 334. The high-rate PHY module 332 adds PHY headers to data packets, and sends the packets over the high-rate channel 352 via the first antenna system 342. The first antenna system 342 may be capable of directional transmission and/or reception. The low-rate PHY module 332 adds PHY headers to control or data packets from the MAC layer 320, and sends the packets over the low-rate channel 354 via the second antenna system 344. The second antenna system may be capable of omni-directional and/or directional transmission and/or reception. In certain embodiments, the second antenna system 344 is configured to perform omni-directional transmission/reception as a default and to optionally provide directional transmission/reception.

Alternatively, the illustrated wireless station 300 may serve as a receiver. When serving as a receiver, the application layer 310, the MAC layer 320, and the PHY layer 330 of the station 300 can perform an inverse processing method of the layers 310-330 to regenerate data from data packets transmitted from another station over the wireless channels. A skilled technologist will appreciate that the configuration of the station can vary widely, depending on the design of the station as long as the station can send data and control information via a high rate channel and a low-rate channel, as described above.

Figure 4:
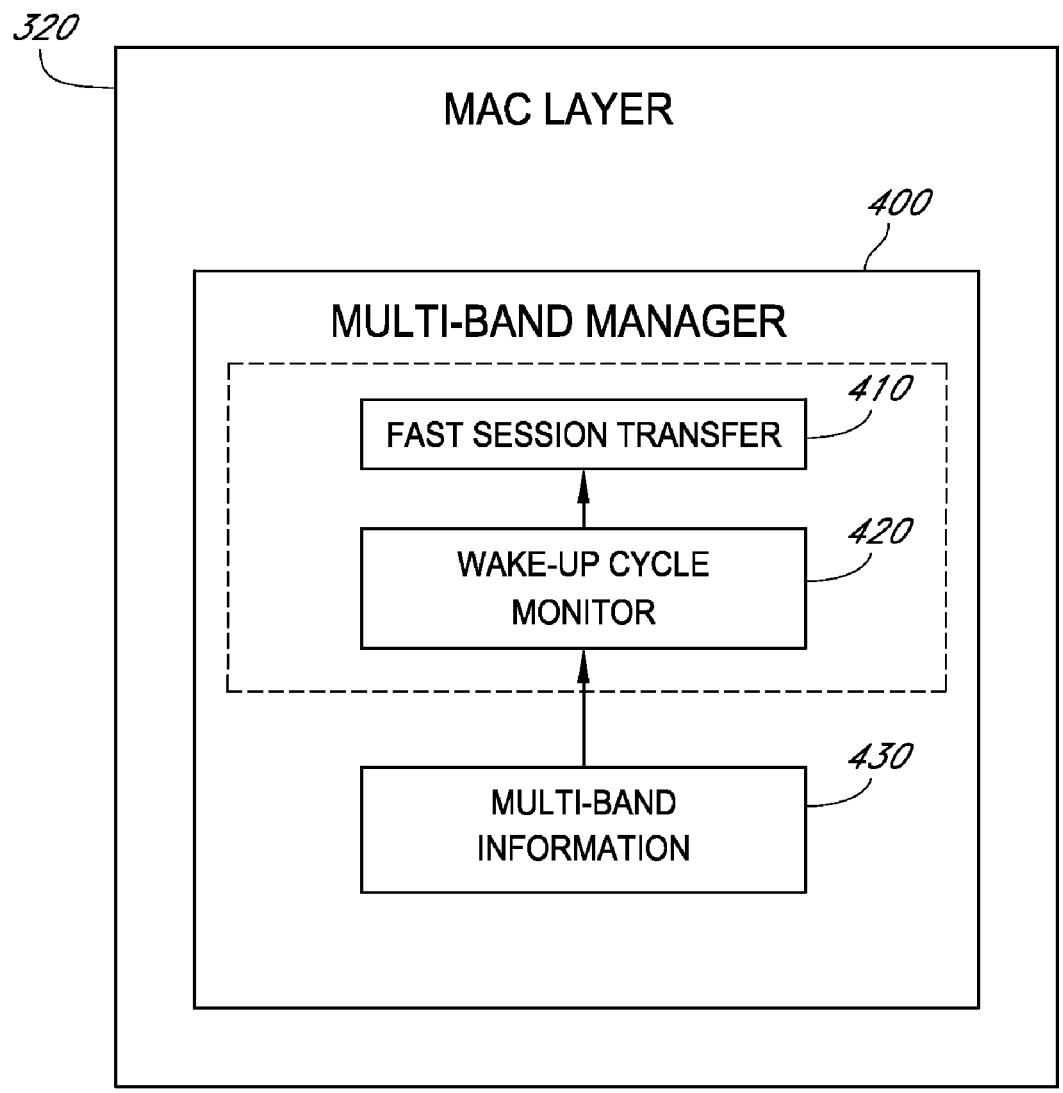
FIG. 4 is a block diagram illustrating the MAC layer of the wireless device of FIG. 3, including a multi-band manager according to one embodiment.

Referring to FIG. 4, the MAC layer of a multi-band wireless station (for example, the first and second stations 230, 240 of FIG. 2) according to one embodiment will be described below. The illustrated MAC layer 320 can also include a multi-band manager 400 in addition to one or more of the components 322, 324, 326, 328 of the MAC layer 320 of FIG. 3.

The multi-band manager 400 serves to manage use of multiple bands, based at least partly on multi-band information 430. The multi-band information 430 can be stored in a storage device (for example, a memory, a solid state disk, and/or a hard disk) of the multi-band station itself. At least part of the multi-band information 430 can be provided and updated by the multi-band station. In addition, at least part of the multi-band information 430 can be provided and updated by another wireless station or an access point.

In some embodiments, access points and/or non-access point wireless stations can periodically switch between an active mode and an inactive mode for saving power. The term "active mode" can also be referred to as an "awake mode" or "normal mode." The term "inactive mode" can also be referred to as a "sleep mode," "doze mode," or "power saving mode." Each of such access points and non-access point stations can have a wake-up cycle or schedule. In such embodiments, the multi-band information 430 can also include information on the wake-up cycle or schedule of one or more of the access points and non-access point stations.

In the illustrated embodiment, the multi-band manager 400 can include a fast session transfer module 410 and a wake-up cycle monitor module 420. The wake-up cycle monitor module 420 can monitor the wake-up cycle or schedule of its own and one or more of the access points and other non-access point stations on one or more of the multiple bands, based at least partly on the multi-band information 430. Other details of the operation of the multi-band station including the wake-up cycle monitor module 420 will be described below in connection with FIGS. 5A-9.

The fast session transfer module 410 can switch transmission between the multiple bands, based at least partly on the availability of the bands and the wake-up cycle or schedule of an access point and/or another wireless station. For example, while the first station 230 (FIG. 2) is using the low-rate band in communication with the second station 240 (FIG. 2), the first station 230 can switch to the high-rate band if the high-rate band is available for communication with the second station 240 and the second station 240 is awake. A skilled technologist will appreciate that the modules 410, 420 can be implemented using various software and/or hardware components, not limited to those shown in FIG. 4.

In one embodiment, the LR access point 215 of FIG. 2 can include an application layer, a MAC layer, and a PHY layer which are configured to process, send, and receive signals over the low-rate channel. Each of the HR access points 225a, 225b of FIG. 2 can include an application layer, a MAC layer, and a PHY layer which are configured to process, send, and receive signals over the high-rate channel. A skilled technologist will appreciate that various configurations of access points can be adapted for use as the LR access point 215 and the HR access points 225a, 225b.

Wake-Up Coordination in Multi-Band Wireless Network

A multi-band wireless system can include multi-band wireless stations, each of which can use multiple bands for wireless communication with another station. Because the multiple bands may have different characteristics (for example, coverage and signal strength) from one another, the multi-band wireless stations may be in a situation to be able to use some of the multiple bands, but not other bands, for wireless communication at a given time.

In such an instance, the stations can be associated with each other via one of available bands, and use the band for communication between the stations. For example, the stations can be associated with each other over a low frequency band. In the context of this document, a band which multi-band stations are currently using for communication between them can be referred to as an "associated band." On the other hand, a band which multi-band stations are not currently using for communication between them can be referred to as an "unassociated band." However, it may be desirable to use an unassociated band (for example, a higher frequency band) for faster data transmission when the unassociated band becomes available. Thus, there is a need for keeping track of the status and/or availability of the multiple bands.

In one embodiment, two or more multi-band wireless stations can form a link or connection for communication by associating with each other on a first (associated) band of multiple bands. The multi-band wireless stations can exchange information of a second (unassociated) band on which no link is currently established between the stations. The exchange of the information can be performed on the first (associated) band. Based on the exchanged information, the stations can determine whether the second (unassociated) band is now available for data transmission between them, and can switch to the second band if the second band is available.

In some embodiments, access points and/or non-access point wireless stations can periodically switch between awake mode and sleep mode on one or more wake-up schedules for saving power. In certain embodiments, access points and/or non-access point stations in a multi-band wireless system (for example, the system 200 of FIG. 2) can use such a power saving scheme with wake-up schedules different from one another. In addition, each of the access point and the stations can have independent wake-up schedules on the multiple bands that it can use.

In such embodiments, after any two of the access point and the stations establish a link on a first (associated) band, either or both of the two devices may be in sleep mode on a second (unassociated) band. For example, two multi-band stations, which have formed a link therebetween on a low-frequency band, can be active on the low-frequency band while either or both of the stations are in sleep mode on a high-frequency band. In such an instance, an attempt by a station to associate with an access point in sleep mode or to establish a link with another station in sleep mode on the unassociated band would be unsuccessful. In addition, without having information on the wake-up schedules of the access point and/or the other station, the station needs to make multiple attempts until it can successfully communicate with the access point or the other station in awake mode. This would not only take long time, but also waste power, thereby adversely affecting the performance of the station. Thus, there is a need for exchanging information on the wake-up schedules in advance between the stations in a multi-band wireless system.

In one embodiment, non-access point wireless stations in a multi-band wireless system share information on the wake-up schedules on an unassociated band of an access point and/or the non-access point stations in the system, using an associated band. In addition, the access point on the unassociated band may also share such information with the non-access point stations. In another embodiment, the non-access point wireless stations can share information on the awake windows on an unassociated band of the non-access point stations in the system, using an associated band. The non-access point stations can share such information with one another.

In some embodiments, the access point on an unassociated band can adjust its wake-up duty cycle on the unassociated band for facilitating association with one or more stations. Some of the wireless stations can also adjust their wake-up duty cycles on an unassociated band for facilitating setting up a link between the stations. Further, some of the wireless stations can adjust their awake windows on an unassociated band for facilitating setting up a link between the stations. These schemes allow the stations in the multi-band wireless system to effectively and quickly associate with an access point and to establish a link therebetween, thereby saving power.

Figure 5A:
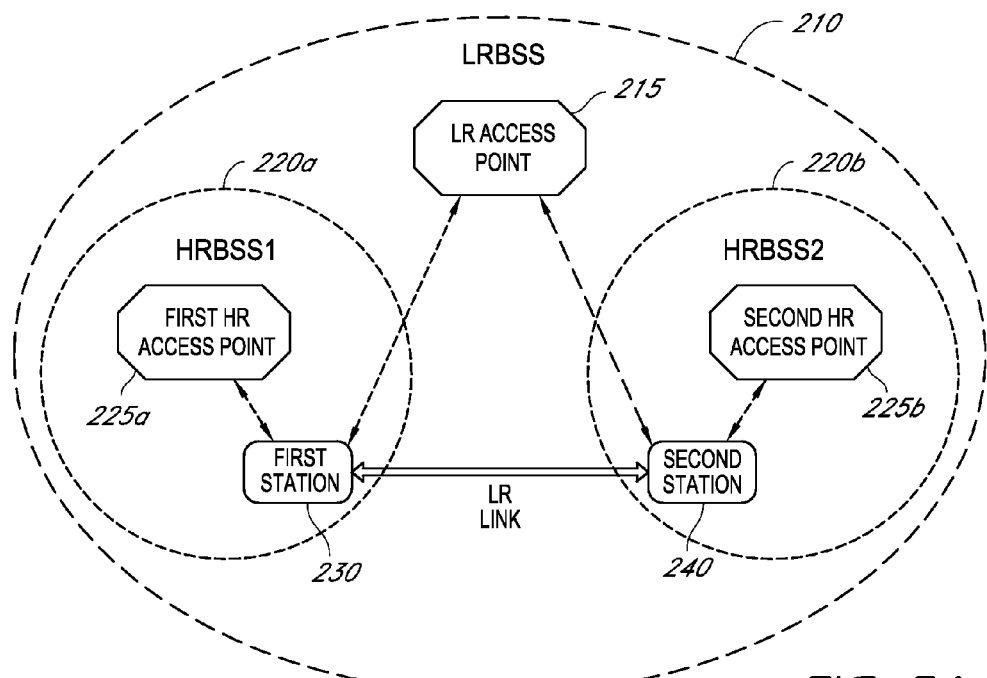
FIGS. 5A-5D illustrate a method of wireless communication by multi-band wireless devices according to one embodiment.

Referring to FIGS. 5A-5D, a method of wireless communication between multi-band stations in multi-band networks according to one embodiment will be described below. As shown in FIG. 5A, a first multi-band station 230 and a second multi-band station 240 are within the range of a low-rate network 210. Both of the first and second stations 230 have performed an association process with a low-rate (LR) access point 215, and are now connected to the LR access point 215 on a low-rate band (or channel). In the context of this document, such a network may also be referred to as a low-rate basic service set (LRBSS).

At the same time, the first station 230 is within the range of a first high-rate network 220*a*, and the second station 240 is within the range of a second high-rate network 220*b*. The first station 230 has performed an association process with a first high-rate (HR) access point 225*a*, and is now connected to the first HR access point 225*a* on a high-rate band (or channel). In the context of this document, such a network may also be referred to as a first high-rate basic service set (HRBSS1).

The second station 240 has performed an association process with a second high-rate (HR) access point 225*b*, and is now connected to the second HR access point 225*b* on the same high-rate band (or channel) as that of the first high-rate basic service set (HRBSS1). In the context of this document, such a network may also be referred to as a second high-rate basic service set (HRBSS2). Other details of the access points 215, 225*a*, 225*b*, and the stations 230, 240 can be as described above in connection with FIG. 2.

Because there is no overlap between the first and second high-rate networks 220*a*, 220*b*, the first and second stations 230, 240 cannot communicate with each other over the high-rate band. However, both the first and second stations 230, 240 are associated with the LR access point 215 on the low-rate band, and thus the first and second stations 230, 240 can establish a link on the low-rate band. The link may be, for example, a peer-to-peer (P2P) link or a direct link specified under IEEE 802.11 standard. The term "direct link" refers to a bidirectional link from one non-access point (non-AP) quality of service (QoS) station to another non-AP QoS station operating in the same infrastructure QoS basic service set (BSS) that does not pass through a QoS access point. Once a direct link has been set up, all frames can be exchanged directly between the two non-AP QoS stations.

In the context of this document, a band which multi-band stations are currently using for communication between them can be referred to as an "associated band." For example, the low-rate band in FIG. 5A can be an associated band. On the other hand, a band which multi-band stations are not currently using for communication between them (because no association between them has been yet established) can be referred to as an "unassociated band." For example, the high-rate band in FIG. 5A can be an unassociated band. A band may not be used for communication between multi-band stations for various reasons, including, but not limited to: an inferior link quality (for example, Bit Error Rate (BER), Signal to Interference and Noise Ratio (SINR), Received Signal Strength Indication (RSSI), and the like), a lower data rate, a lower effective available time due to a higher channel load, a different awake schedule, and distance separation.

In the illustrated embodiment, each of the first and second high-rate access points 225*a*, 225*b*, the first station 230, and the second station 240 can periodically switch between awake mode and sleep mode on a wake-up schedule. One or more of the first and second high-rate access points 225*a*, 225*b*, the first station 230, and the second station 240 can have a different wake-up schedule on the high-rate band from the others.

In such an embodiment, the first and second stations 230, 240 can exchange information on the status of the unassociated (high-rate) band over the associated (low-rate) band. The information can include information on the wake-up schedules on the unassociated (high-rate) band of the high-rate access points 225a, 225b, the first station 230, and the second station 240. Details of the information will be described below in connection with FIGS. 6, 7A and 7B.

In one embodiment, the information on the wake-up schedules can be periodically generated and transmitted on the low-rate (used) band between the stations 230, 240. In another embodiment, the information can be generated and transmitted by one of the stations 230, 240 upon a request by the other of the stations 230, 240. In addition, the information can be transmitted between the stations 230, 240 when there is a change in the information. In certain embodiments, the information can be transmitted between the stations 230, 240 only when there is a change in the information. In such embodiments, less power is consumed by the stations than when the status is periodically transmitted.

Figure 5B:
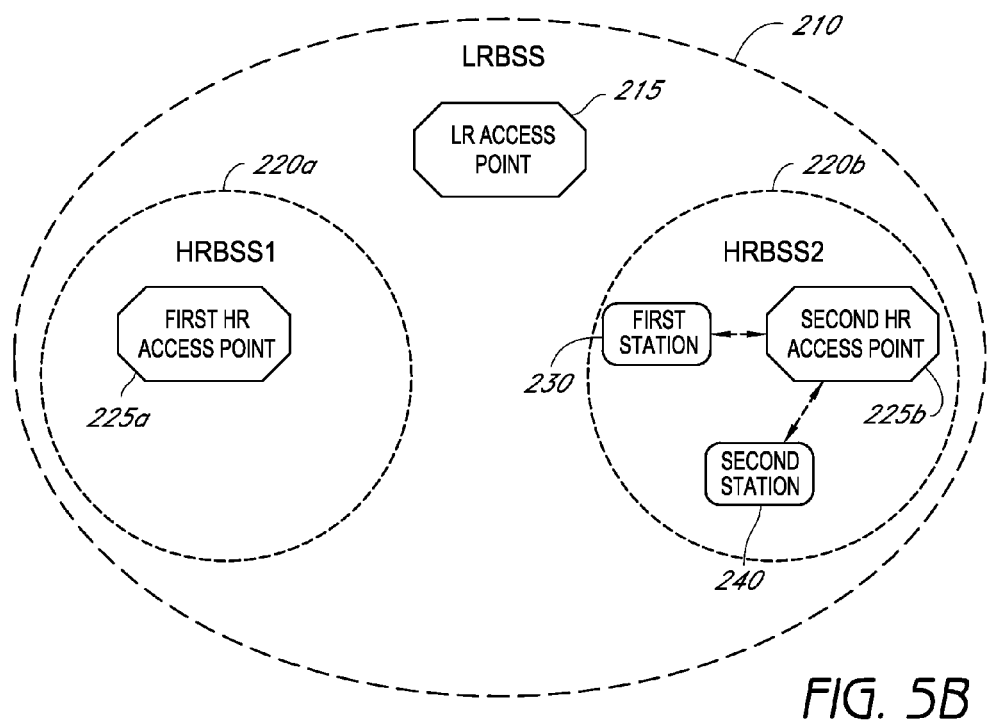

Referring to FIG. 5B, the first station 230 has moved closer to the second HR access point 225b such that the first station 230 is within the range of the second HR network 220b and is no longer within the range of the first HR network 220a. The first station 230 can now successfully associate with the second high-rate access point 225b during an awake period of the second HR access point 225b, based at least partly on the information on the wake-up schedule of the second HR access point 225b. Thus, the first station 230 can avoid attempting to associate with the second HR access point 225b while the access point 225b is inactive, thereby preventing waste of power.

Figure 5C:
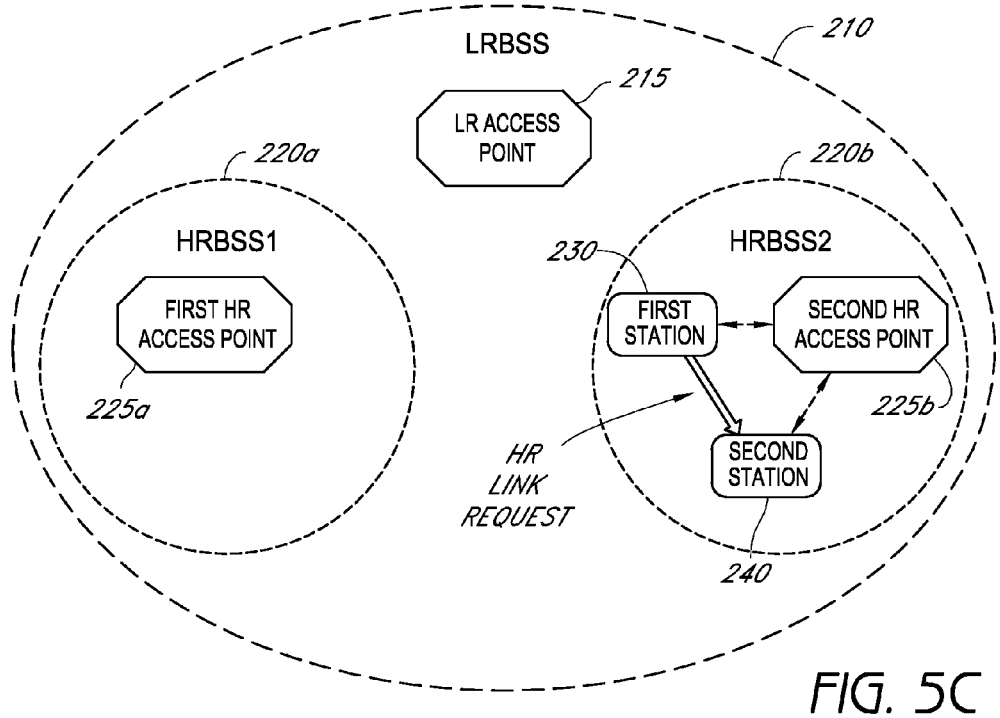

Referring to FIG. 5C, the first station 230 can send the second station 240 a request to establish a link on the unassociated (high-rate) band with the second station during an awake period of the second station 230, based at least partly on the information on the wake-up schedule of the second station 240. Thus, the first station 230 can avoid attempting to establish a link with the second station 240 while the second station 240 is inactive, thereby preventing waste of power. In one embodiment, the link between the first and second stations 230, 240 can be a direct link. In another embodiment, the link between the first and second stations 230, 240 can be established via the low-rate access point 215.

Figure 5D:
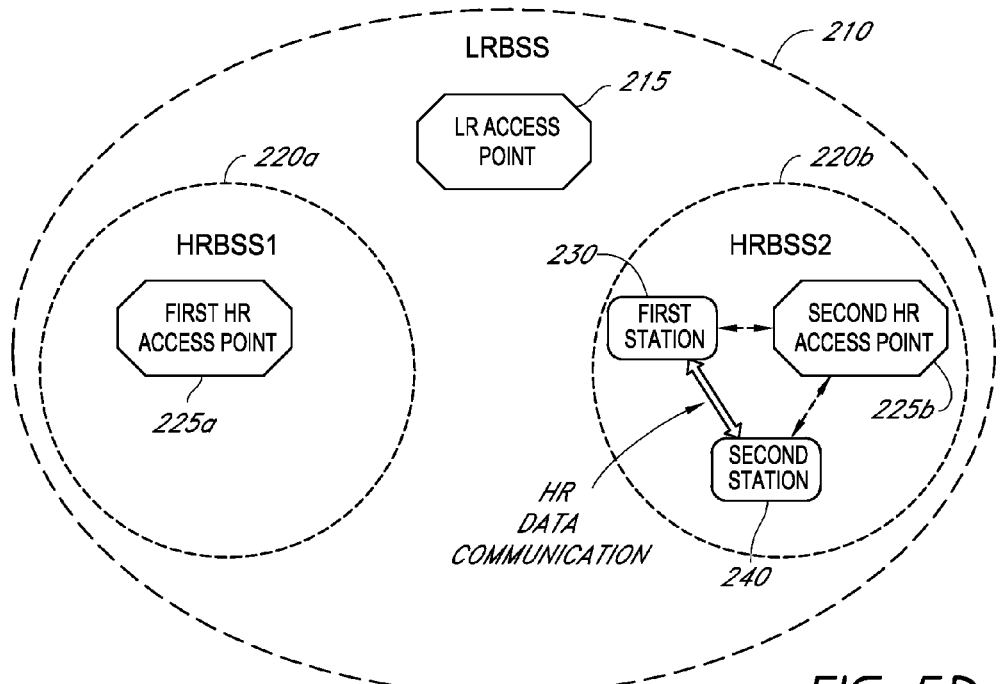

Once a link is established on the high-rate band between the first and second stations 230, 240, either or both of the stations 230, 240 can determine if a session transfer from the low-rate band to the high-rate band can be triggered. The determination can be based at least partly on, for instance, whether it may be more efficient to change the transmission channel. Efficiency of the transmission can be determined by the multi-band manager, based on various factors (for example, the beacon quality from the new unassociated BSS meets the acceptable SNR limit). In one embodiment, this process can be performed at least partly by the multi-band manager of the station 230, 240, as shown in FIG. 4. After the session transfer is completed, the first and second stations 230, 240 can use the link for data communication between them, as shown in FIG. 5D.

Figure 6:
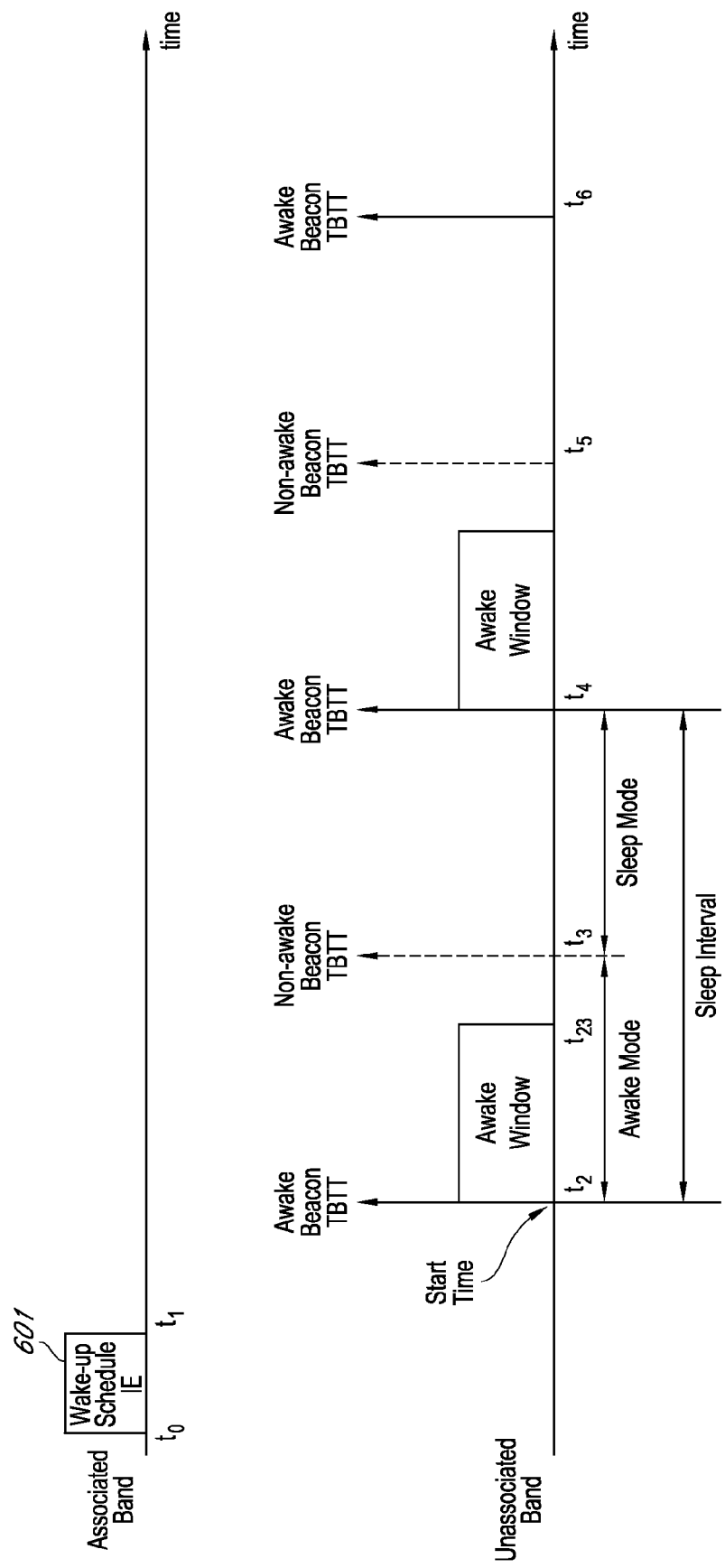
FIG. 6 is a timing diagram illustrating a method of wireless communication by a multi-band wireless device transmitting a wake-up information element for wake-up schedules according to one embodiment.

Referring to FIG. 6, one embodiment of wireless communication by a multi-band wireless device operating on a wake-up schedule will be described below. In the illustrated embodiment, awake beacons and non-awake beacons are alternately transmitted at a selected interval from an access point on one of multiple bands that the multi-band device can use. The awake beacons are transmitted at, for example, $t_2$, $t_4$, and $t_6$ in FIG. 6. The non-awake Target Beacon Transmission Time (TBTT) occurs at, for example, $t_3$ and $t_5$ in FIG. 6. In one embodiment, the non-awake TBTTs may not have beacons present when the access point is in sleep mode as well.

The multi-band station can switch between awake mode and sleep mode. For example, the multi-band station, when it has a 50% awake period duty cycle (more details on the awake period duty cycle will be described later), can be in awake mode between an awake beacon and an immediately following non-awake beacon, and in sleep mode between a non-awake beacon and an immediately following awake beacon.

In the illustrated embodiment, the multi-band wireless device can transmit a wake-up schedule information element 601 on an associated band to an access point and/or other stations on the associated band. The wake-up schedule information element 601 can be transmitted during a time period between $t_0$ and $t_1$.

The wake-up schedule information element 601 can include information on the wake-up schedules of the unassociated band of the multi-band station itself or an access point with which the multi-band station is associated. For example, in the embodiment of FIGS. 5A-5D, the second station 240 can transmit a wake-up schedule information element on the low-rate band. The information element can include the wake-up schedules of the second station 240 itself and/or the second high-rate access point 225b.

In one embodiment, the wake-up schedule information element 601 can include information on the start time of a wake-up schedule on an unassociated band. In FIG. 6, the start time can be $t_2$.

The wake-up schedule information element 601 can also include information on a sleep interval, which represents a time difference between the starting points in time of two successive awake windows or a duration of one cycle of awake mode and sleep mode. In FIG. 6, the sleep interval can be a time difference between $t_2$ and $t_4$.

The wake-up schedule information element 601 can further include information on an awake window on the unassociated band. In FIG. 6, the awake window can be between $t_2$ and $t_{23}$. During the awake window of the multi-band station, other stations can perform contention-based communication with the multi-band station on the unassociated band. While the multi-band station is in awake mode, but is out of the awake window, other stations can perform pre-scheduled communication with the multi-band station. A time period between $t_2$ and $t_3$ can be referred to as an awake period. In FIG. 6, an awake window ($t_2$ to $t_{23}$) is shown to be shorter than the awake period ($t_2$ to $t_3$). However, in another embodiment, the length of the awake period and awake window can be substantially the same as each other, i.e., the awake period and awake window substantially fully overlap with each other. Other details of the wake-up schedule information element 601 will be described below in connection with FIGS. 7A and 7B.

Figure 7A:
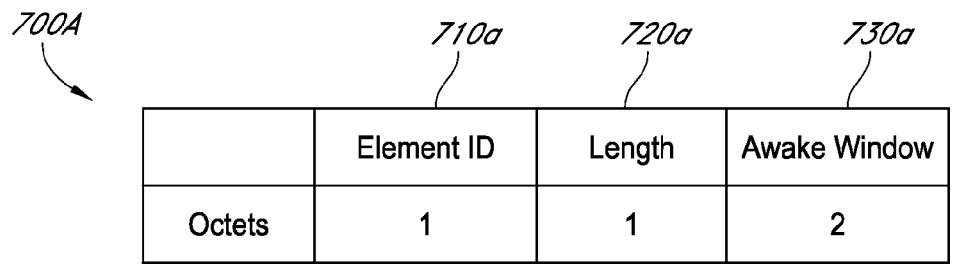
FIG. 7A is a frame format of an information element including information on an awake window according to one embodiment.
Figure 7B:
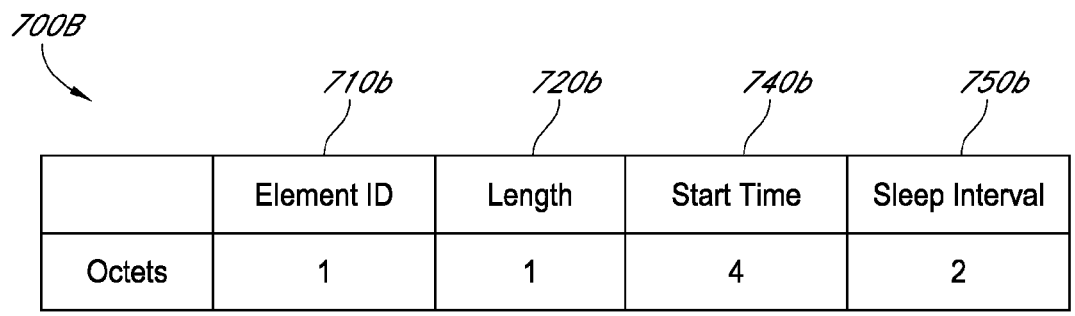
FIG. 7B is a frame format of an information element including information on a wake-up schedule according to one embodiment.

Referring to FIGS. 7A and 7B, one embodiment of a frame format for a wake-up schedule information element will be described below. The wake-up schedule information element can be part of any suitable control frame exchanged between multi-band wireless devices. The wake-up schedule information element can include information on wake-up schedules and/or awake window, as described above in connection with FIG. 6.

Referring to FIG. 7A, an information element according to one embodiment can include information on the awake window of the multi-band station. The illustrated information element 700A includes an element ID field 710a, a length field 720a, and an awake window field 730a.

In the illustrated embodiment, the element ID field 710a includes information indicative of the identifier of the information element 700A, and is one octet long. The length field 720a indicates the length of the information element 700A, and is one octet long. The awake window field 730a includes the length of the awake window measured in microsecond, and is two octets long.

Referring to FIG. 7B, an information element according to another embodiment can include information on the wake-up schedules of a multi-band station. The illustrated information element 700B includes an element ID field 710b, a length field 720b, a start time field 740b, and a sleep interval field 750b.

In the illustrated embodiment, the element ID field 710b includes information indicative of the identifier of the information element 700B, and is one octet long. The length field 720b indicates the length of the information element 700B, and is one octet long.

The start time field 740b can be 4 octets long. For non-access point station management, the start time field 740b can indicate anticipated start time, expressed in microseconds, from the end of transmission of the information element to a first awake beacon. The start time field 740b can include a value that represents the lower order 4 octets of a timing synchronization function (TSF) timer value at the start of the first awake beacon. The term "timing synchronization function" refers to a function that keeps the timers for all stations in the same basic service set synchronized. An example of the TSF timer is specified in IEEE 802.11 standard. For access point power management, the start time field 740b can indicate start time, expressed in microseconds, of a first non-awake beacon interval. The start time field 740b can include a value that represents the lower order 4 octets of a TSF timer value at the start of the first non-awake beacon interval.

The sleep interval field 750b can be 2 octets long. For non-access point station management, the sleep interval field 750b indicates time, expressed in number of target beacon transmission times (TBTTs), between two successive awake beacons. For access point power management, the sleep interval field 750b indicates the length of the access point sleep interval, expressed in number of TBTTs. A skilled technologist will appreciate that the configuration and order of each of the fields of the information elements of FIGS. 7A and 7B can vary widely depending on the design of the wireless system.

In certain embodiments, an information element can include information on both the awake window of the multi-band station and the wake-up schedules of the station and its access point on the unassociated band. In such embodiments, the information element can include an element ID field, a length field, an awake window field, a start time field, and a sleep interval field. Details of these fields can be as described above in connection with FIGS. 7A and 7B.

Figure 8:
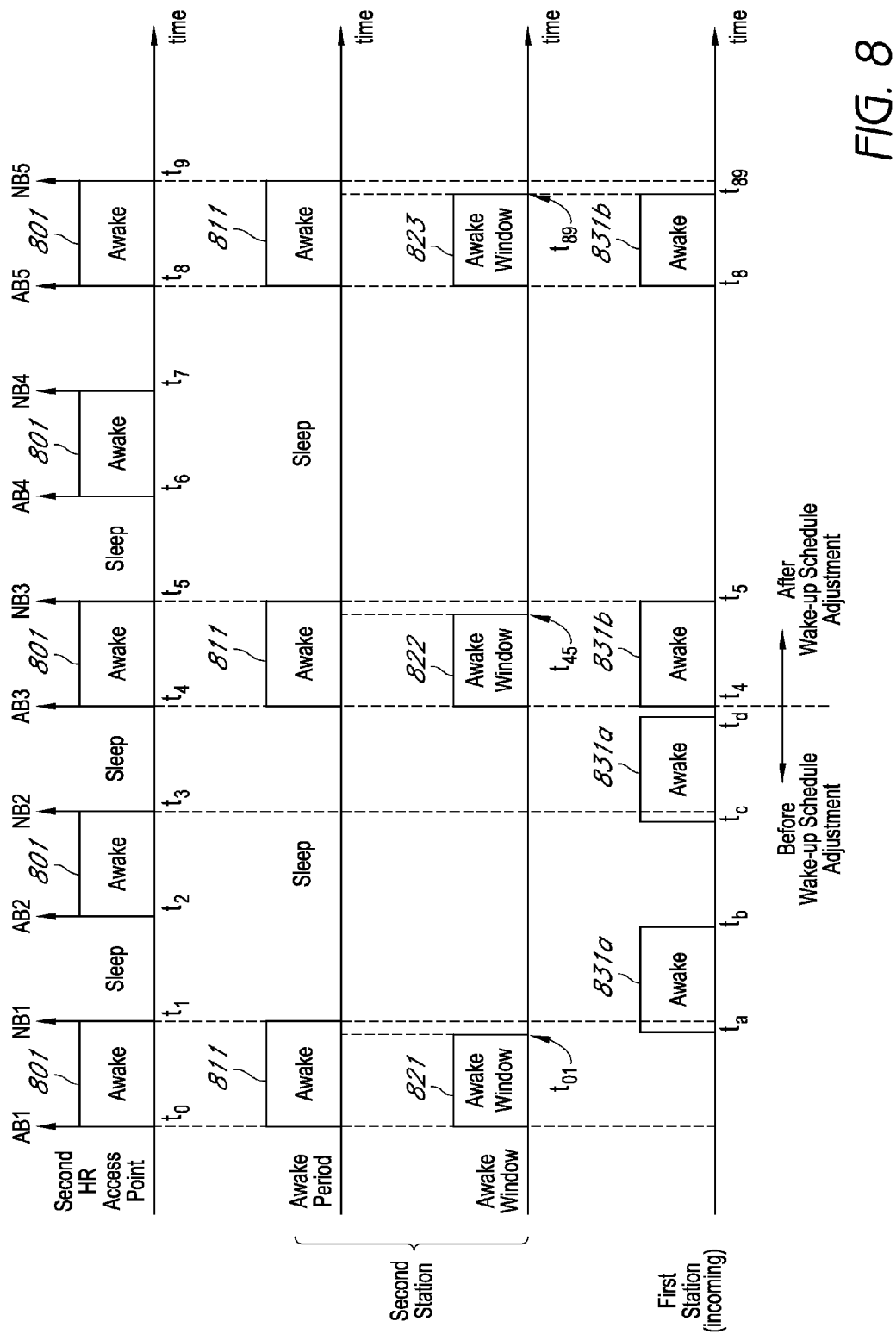
FIG. 8 is a timing diagram illustrating a method of wireless communication by multi-band wireless devices operating on wake-up schedules according to one embodiment.

Referring to FIG. 8, a method of wireless communication between multi-band wireless stations operating on a wake-up cycle or schedule according to one embodiment will be described below. FIG. 8 is a timing diagram illustrating one example of wake-up cycles on an unassociated (high-rate) band of the second high-rate access point 225b, the first station 230, and the second station 240 of FIGS. 5A-5D.

In the illustrated embodiment, the second station 240 is associated with the second high-rate access point 225b. The first station 230 is associated with the first high-rate (HR) access point 225a at first, as shown in FIG. 5A. The first station 230 can move close to the second HR access point 225b, as shown in FIG. 5B. In the illustrated embodiment, each of the first and second stations 230, 240 can share and monitor the wake-up cycle or schedule of its own and one or more of the access points and other non-access point stations, as described above in connection with FIGS. 4 and 5A.

In the illustrated embodiment, the second high-rate access point 225b transmits awake beacons AB1-AB5 and non-awake beacons NB1-NB5 at a selected interval. For example, the second high-rate access point 225b can alternately transmit the beacons AB1-AB5 and NB1-NB5 at $t_0, t_1, t_2, \ldots, t_9$. The second high-rate access point 225 is awake during awake periods 801, for example, between $t_0$ and $t_1$, between $t_2$ and $t_3$, between $t_4$ and $t_5$, between $t_6$ and $t_7$, and between $t_8$ and $t_9$. In the illustrated embodiment, $t_1, t_3, t_5, t_7,$ and $t_9$ are at a midpoint between $t_0$ and $t_2$, between $t_2$ and $t_4$, between $t_4$ and $t_6$, between $t_6$ and $t_8$ and between $t_8$ and $t_{10}$ (not shown), respectively.

The second high-rate access point 225b has an awake period duty cycle of 50%. The term "awake period duty cycle" refers to a ratio of an awake period duration to a sleep interval. As described above, the sleep interval is a period between the starting points in time of two immediately succeeding awake periods. With respect to the second high-rate access point in FIG. 6, it can be calculated from, for example, "$(t_1-t_0)/(t_2-t_0) \times 100$."

The second station 240 is awake during awake periods 811, for example, between $t_0$ and $t_1$, between $t_4$ and $t_5$, and between $t_8$ and $t_9$. The second station 240 has an awake period duty cycle of 25%, which can be calculated from, for example, "$(t_1-t_0)/(t_4-t_0) \times 100$."

The second station 240 has an awake window during each of its awake period. The awake window starts at the starting point in time of the awake period, and ends before the ending point in time of the awake period. In FIG. 6, for example, a first awake window 821 starts at $t_0$ and ends at $t_{01}$ which is between $t_0$ and $t_1$. A second awake window 822 starts at $t_4$ and ends at $t_{45}$ which is between $t_4$ and $t_5$. A third awake window 823 starts at $t_8$ and ends at $t_{89}$ which is between $t_8$ and $t_9$.

The first station 230 can have its own wake-up schedule that is not synchronized with the wake-up schedules of the second station 240 and/or the second high-rate access point 225b. For example, the first station 230 can have awake periods 831a, based on its wake-up schedule. However, the first station 230 can also have information on the wake-up schedules of the second station 240 and/or the second high-rate access point 225b by receiving wake-up schedule information elements.

When the first station 230 has moved close to the second high-rate access point 225b, the first station 230 can adjust its wake-up schedule, based at least partly on the wake-up schedule of the second high-rate access point 225b. For example, the first station 230 can have adjusted awake periods 831b that are at least partially synchronized with the awake periods 801, 811 of the second station 240 and/or the second high-rate access point 225b.

Then, the first station 230 can attempt to associate with the second high-rate access point 225b during an awake period 801 of the second high-rate access point 225b. For example, the first station 230 can initiate an association process with the second high-rate access point 225b between $t_4$ and $t_5$.

Once the association process is successfully completed, the first station 230 can also attempt to establish a link with the second station 240 during an awake window of the second station 240. For example, the first station 230 can attempt to set up a link with the second station 240 during a next available awake window of the second station 240, for example, the third awake window 823. When setting up such a link, the first station 230 can transmit a control frame to request for setting up, for example, a direct link. In one embodiment, the control frame can be an ad-hoc traffic indication message (ATIM). In another embodiment, the first station 230 can establish a link with the second station 240 via the second high-rate access point 225b. In other embodiments, the first station 230 can establish a link with the second station 240 without first associating with the high-rate access point 225b.

Figure 9:
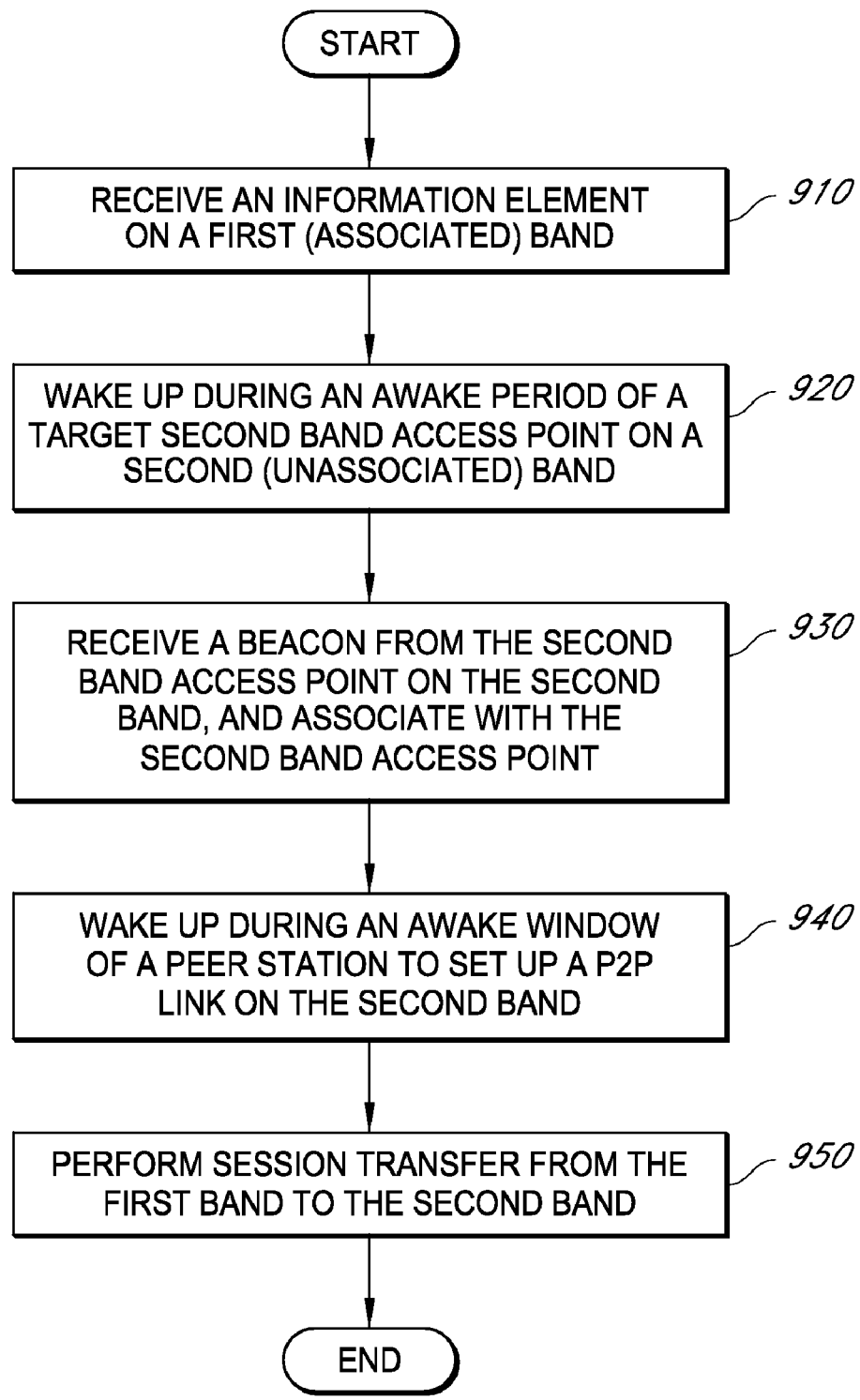
FIG. 9 is a flowchart illustrating a method of wireless communication using a wake-up schedule according to one embodiment.

Referring to FIG. 9, a process of wireless communication using a multi-band wireless station operating on one or more wake-up schedules according to one embodiment will be described below. The illustrated process can be performed by a station (for example, the first station 230 of FIGS. 5A-5D) moving close to a new access point (for example, the second high-rate access point 225b of FIGS. 5A-5D) on an unassociated band (for example, a high-rate band). The access point can be associated with another wireless station (for example, the second station 240 of FIGS. 5A-5D) on the unassociated band. The other station can have a pre-established link with the station on an associated band (for example, a low-rate band).

At block 910, the first station 230 can receive a wake-up schedule information element including information on the associated band. The information can include the wake-up schedules of the second high-rate access point 225b and the second station 240 and the awake window of the second station 240.

At block 920, the first station 230 can wake up immediately before or during an awake period on the unassociated band of the second high-rate access point 225b, based at least partly on the wake-up schedule of the second high-rate access point 225b. At block 930, the first station 230 can receive a beacon signal on the unassociated band from the second high-rate access point 225b, and perform an association process with the second high-rate access point 225b during the awake period on the unassociated band. Then, the first station 230 can optionally go into an inactive or sleep mode.

At block 940, the first station 230 can wake up immediately before or during an awake period on the unassociated band of the second station 240, based at least partly on information on the awake window of the second station 240. The first station 230 can establish a link with the second station 240 by performing an association process during the awake window on the unassociated band.

At block 950, the first station 230 and the second station 240 can perform a session transfer from the associated band to the newly associated band. Then, the first and second stations 230, 240 can communicate data with each other on the newly associated band.

In certain embodiments, an access point and/or non-access point stations can adjust their wake-up schedules after exchanging wake-up schedule information elements with one another for facilitating association and link formation. For example, after receiving the wake-up schedules of the second high-rate access point 225b and the second station 240 at block 910, the first station 230 can suggest an alternative wake-up schedule on the unassociated band to the second high-rate access point 225b and the second station 240. In response, the second high-rate access point 225b and the second station 240 can adjust their wake-up schedules and/or awake window on the unassociated band. In other embodiments, an access point and/or non-access point stations can adjust their wake-up duty cycles on an unassociated band after exchanging wake-up schedule information elements with one another.

In the methods of the embodiments described above, one or more blocks may be omitted, depending on the design of the system. In addition, two or more of the blocks may be combined together. A skilled technologist will also appreciate that the methods may include additional blocks, depending on the design of the system.

The methods of the embodiments described above allow a multi-band station to test the availability of an access point and/or another station without performing unnecessary scanning during their sleep periods. Thus, the multi-band station can effectively and promptly associate with an access point or the other station on an unassociated band. This also saves power, which is an important resource in most wireless devices, especially mobile devices.

The embodiments described above may be used for data (e.g., video data and audio data) streaming over a wireless network. For example, the embodiments may be adapted for transmission of uncompressed video in a wireless local area network (WLAN) under the IEEE 802.11 standard (for example, IEEE 802.11ad). The embodiments can also be adapted for a wireless system having a very high throughput (VHT) of about 0.5 Gbps to about 4 Gbps. For example, the embodiments can be adapted for a standard such as the WiGig standard. In other arrangements, the embodiments can be adapted for a wireless system having a bandwidth of 60 GHz, while supporting the IEEE 802.11 standard.

While the above detailed description has shown, described, and pointed out the fundamental novel features of the invention as applied to various embodiments, it will be understood that various omissions and substitutions and changes in the form and details of the system illustrated may be made by those skilled in the art, without departing from the intent of the invention.

What is claimed is:

1. A device for wireless communication, the device comprising:
   a first antenna system that uses a first frequency band for wireless communication;
   a second antenna system that uses a second frequency band for wireless communication, the second frequency band being different from the first frequency band;
   a memory that stores information comprising one or more wake-up schedules on the second frequency band of the device and/or other wireless devices; and
   a physical (PHY) layer that transmits and/or receives a signal on the first frequency band, wherein the signal contains at least part of the one or more wake-up schedules on the second frequency band of the device and/or other wireless devices,
   wherein the device switches communication between the first frequency band and the second frequency band based on frequency band availability and the one or more wakeup schedules of another wireless device.

2. The device of claim 1, wherein the first frequency band has a lower frequency than the second frequency band, and wherein the first frequency band has a longer range of transmission than the second frequency band.

3. The device of claim 2, wherein the first frequency band has a frequency of about 2.4 or 5 GHz, and wherein the second frequency band has a frequency of about 60 GHz.

4. The device of claim 2, wherein the first antenna system uses the first frequency band for wireless communication in a first wireless network, and wherein the second antenna system uses the second frequency band for wireless communication in a second wireless network different from the first wireless network.

5. The device of claim 1, wherein the one or more wake-up schedules comprise information on one or more of an awake period, a sleep period, and an awake window.

6. The device of claim 1, wherein the one or more wake-up schedules comprise information on a wake-up schedule start time and/or a sleep interval.

7. The device of claim 1, wherein the signal comprises an information element containing one or more of an element ID field, a length of element field, and an awake window field.

8. The device of claim 1, wherein the signal comprises an information element containing one or more of an element ID field, a length of element field, a start time field, and a sleep interval field.

9. The device of claim 1, wherein the PHY layer transmits the signal, wherein the signal contains information on one or more wake-up schedules on the second frequency band of the device and/or an access point with which the device is associated.

10. The device of claim 1, wherein the PHY layer receives the signal, wherein the signal contains information on one or more wake-up schedules on the second frequency band of another non-access point wireless device and/or an access point with which the other non-access point wireless device is associated.

11. The device of claim 10, further comprising a MAC layer, wherein the MAC layer adjusts the wake-up schedule of the device, based at least partly on the information contained in the received signal.

12. The device of claim 11, wherein the device associates with an access point and/or a non-access point wireless device via the second frequency band, using the adjusted wake-up schedule of the device.

13. The device of claim 10, wherein the PHY layer transmits a suggested wake-up schedule on the second frequency band for one or more of the device, the other non-access point wireless device, and the access point, based at least partly on the information contained in the received signal.

14. The device of claim 1, wherein the first frequency band is a frequency band on which a peer-to-peer communication link has been established by an association process with another wireless device.

15. The device of claim 1, wherein the second frequency band is a frequency band on which a peer-to-peer communication link has not been established by an association process with another wireless device.

16. The device of claim 1, wherein the device is in awake mode on one or more of the first frequency band and the second frequency band at a given time instance.

17. The method of claim 1, wherein the wireless device switches from the first frequency band to the second frequency band based on availability of communication on the second frequency band with another wireless device and the other wireless device being awake.

18. The method of claim 1, the one or more wakeup schedules of the wireless device and the other wireless device are different from one another on the second frequency band.

19. The method of claim 1, wherein the information comprising one or more wake-up schedules on the second frequency band of the device and/or other wireless devices is transmitted on the first frequency band between the device and other devices only upon a change in the information.

20. A wireless communication system, the system comprising:
a first multi-band wireless station that uses a first frequency band and a second frequency band for wireless communication, the second frequency band being different from the first frequency band; and
a second multi-band wireless station that uses the first frequency band and the second frequency band for wireless communication,
wherein one or more of the first and second stations maintains therein one or more wake-up schedules on the second frequency band of one or more of the first station, the second station, and an access point, and
wherein the first and second stations share the one or more wake-up schedules with each other via the first frequency band,
wherein the first station switches communication between the first frequency band and the second frequency band based on frequency band availability and the one or more wakeup schedules of the access point and the second station.

21. The system of claim 20, wherein the first frequency band has a lower frequency than the second frequency band, and wherein the first frequency band has a longer range of transmission than the second frequency band.

22. The system of claim 20, wherein the first and second stations establish a link between the first and second stations on the first frequency band and to use the link for sharing the one or more wake-up schedules.

23. The system of claim 20, further comprising:
a first access point associated with the first and second stations, using the first frequency band; and
a second access point associated with one or more of the first and second stations, using the second frequency band.

24. The system of claim 23, wherein the one or more wake-up schedules comprise a wake-up schedule of the second access point.

25. The system of claim 20, wherein one or more of the stations adjusts its own wake-up schedule, based at least partly on the one or more wake-up schedules.

26. The system of claim 25, wherein the first and second stations communicate with each other via the second frequency band, using the adjusted wake-up schedule.

27. The system of claim 25, wherein the one or more of the stations associate with the second access point on the second frequency band, using the adjusted wake-up schedule.

28. The system of claim 20, wherein the first frequency band is a frequency band on which a peer-to-peer communication link has been established by an association process between the first and second stations.

29. The system of claim 20, wherein the second frequency band is a frequency band on which a peer-to-peer communication link has not been established by an association process between the first and second stations.

30. The system of claim 20, wherein each of the first and second stations is in awake mode on one or more of the first frequency band and the second frequency band at a given time instance.

31. A method of wireless communication, the method comprising:
establishing, by a first multi-band wireless station that uses first and second frequency bands for wireless communication, a wireless link on the first frequency band with a second multi-band wireless station capable of using the first and second frequency bands for wireless communication, the second frequency band being different from the first frequency band;
transmitting, by the first station, one or more wake-up schedules on the second frequency band to the second station via the first frequency band,
wherein the one or more wake-up schedules comprise a wake-up schedule of the first station and/or an access point, and
wherein the access point is associated with the first station on the second frequency band, wherein the first station switches communication between the first frequency band and the second frequency band based on frequency band availability and the one or more wakeup schedules of the access point and/or the second station.

32. The method of claim 31, wherein the first frequency band has a lower frequency than the second frequency band, and wherein the first frequency band has a longer range of transmission than the second frequency band.

33. The method of claim 31, wherein the one or more wake-up schedules comprise information on one or more of an awake period, a sleep period, and an awake window.

34. The method of claim 31, wherein the one or more wake-up schedules comprise information on a wake-up schedule start time and/or a sleep interval.

35. A method of wireless communication, the method comprising:
   establishing, by a first multi-band wireless station capable of using first and second frequency bands for wireless communication, a wireless link on the first frequency band with a second multi-band wireless station capable of using the first and second frequency bands for wireless communication, the second frequency band being different from the first frequency band;
   receiving, by the first station, one or more wake-up schedules on the second frequency band from the second station via the first frequency band,
   wherein the one or more wake-up schedules comprise a wake-up schedule of the second station and/or an access point, and
   wherein the access point is associated with the second station on the second frequency band,
   wherein the first station switches communication between the first frequency band and the second frequency band based on frequency band availability and the one or more wakeup schedules of the access point and/or the second station.

36. The method of claim 35, wherein the first frequency band has a lower frequency than the second frequency band, and wherein the first frequency band has a longer range of transmission than the second frequency band.

37. The method of claim 35, further comprising adjusting the wake-up schedule of the first station, based at least partly on the received wake-up schedule.

38. The method of claim 37, further comprising communicating, by the first station, with the access point and/or the second station via the second frequency band, based at least partly on the adjusted wake-up schedule.

39. The method of claim 35, further comprising transmitting a suggested wake-up schedule for one or more of the first station, the second station, and the access point, based at least partly on the received wake-up schedule.

* * * * *